Figure 1:
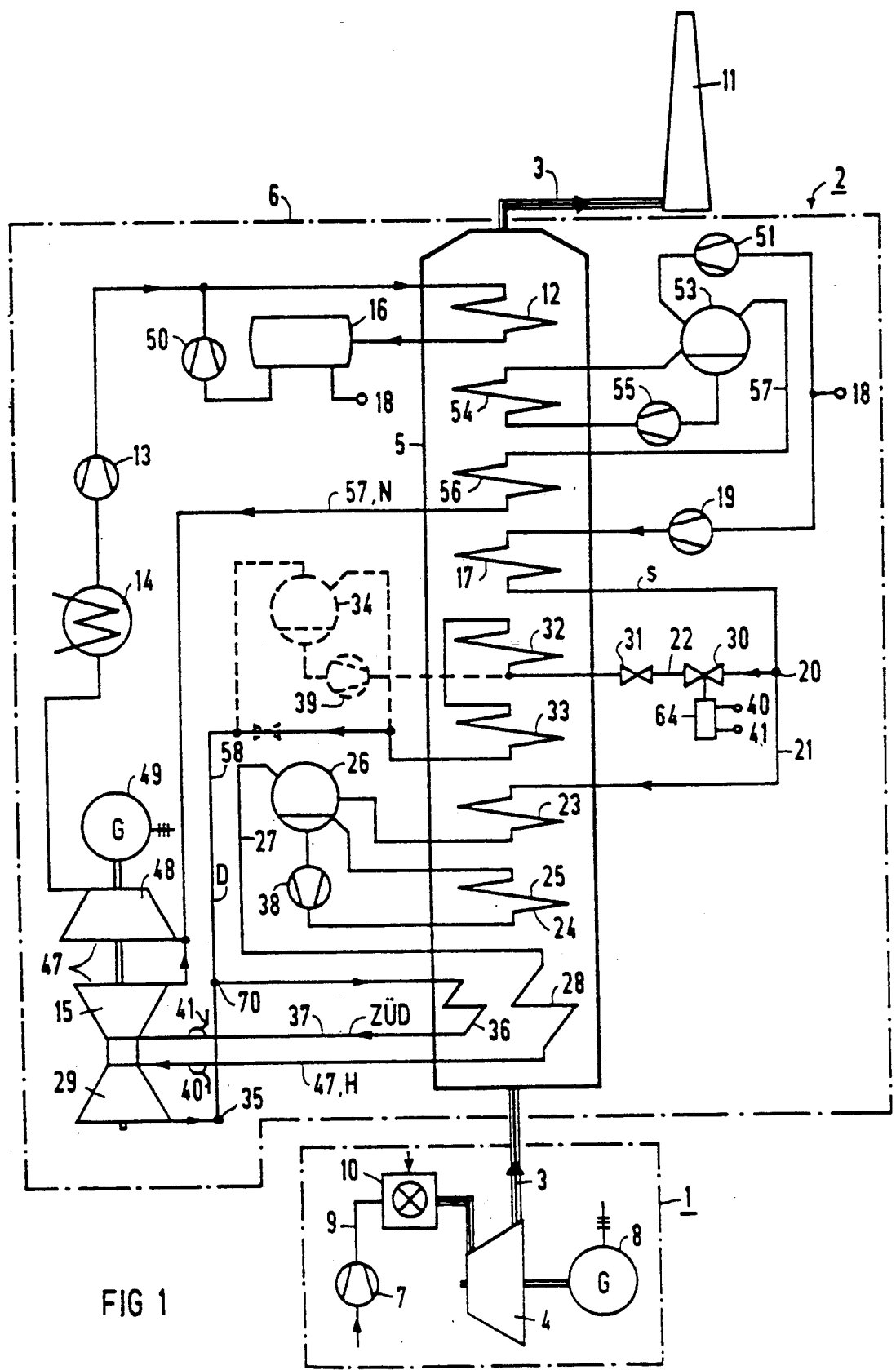

United States Patent [19]

Brückner et al.

[11] Patent Number: 5,044,163
[45] Date of Patent: Sep. 3, 1991

[54] PROCESS AND PLANT FOR GENERATING STEAM USING WASTE HEAT

[75] Inventors: Hermann Brückner, Uttenreuth; Lothar Stadie, Höchstadt; Josef Pulec, Herzogenaurach, all of Fed. Rep. of Germany

[73] Assignee: Siemens Aktiengesellschaft, Munich, Fed. Rep. of Germany

[21] Appl. No.: 555,398
[22] PCT Filed: Feb. 10, 1989
[86] PCT No.: PCT/DE89/00081
  § 371 Date: Aug. 8, 1990
  § 102(e) Date: Aug. 8, 1990
[87] PCT Pub. No.: WO89/07700
  PCT Pub. Date: Aug. 24, 1989

[30] Foreign Application Priority Data

Feb. 12, 1988 [DE] Fed. Rep. of Germany ....... 3804605

[51] Int. Cl.⁵ .............................................. F01K 21/00
[52] U.S. Cl. .................................. 60/677; 60/39.182; 60/663; 60/653; 60/679
[58] Field of Search ................ 60/653, 663, 677, 679, 60/39.182

[56] References Cited

U.S. PATENT DOCUMENTS 3,204,407 9/1965 Meissenberg et al. .
4,693,086 9/1987 Hoizumi et al. ................ 60/663 X
4,920,751 5/1990 Gounder .............................. 60/663

FOREIGN PATENT DOCUMENTS 0129167 12/1984 European Pat. Off. .
1426445 2/1969 Fed. Rep. of Germany .
621186 1/1981 Switzerland .

OTHER PUBLICATIONS

JP-A-58-167811 (Hitachi Seisakusho K.K.) Patent Abstracts of Japan, vol. 8, No. 5 (M-267) (1442), Jan. 1984.

*Primary Examiner*—Allen M. Ostrager
*Attorney, Agent, or Firm*—Herbert L. Lerner; Laurence A. Greenberg

[57] ABSTRACT

In plants for generating steam using waste heat, the heat in the hot waste gases flowing through the steam generator must be utilized with maximum efficiency. To this end, the feed water is branched into two streams, one of which flows into the high-pressure heating surfaces and the other into the heating surfaces of the medium-pressure evaporator. The division of the two streams is controlled as a function of the quality of the steam, so that the steam in the heating surfaces of the intermediate superheater is heated to the same temperature as the steam in the heating surfaces of the high-pressure superheater. The invention is particularly useful in combined gas and steam turbine power plants.

16 Claims, 2 Drawing Sheets

PROCESS AND PLANT FOR GENERATING STEAM USING WASTE HEAT

The invention relates to a process for operating a steam turbine, which has at least a medium-pressure part and a high-pressure part, with the aid of a waste heat steam generator through which hot gas flows, and to a system for performing this process, having a steam turbine of this type and a waste heat steam generator, having a high-pressure system of heating surfaces connected to the high-pressure part of the steam turbine and having intermediate superheating surfaces connected to the exhaust steam line of the high-pressure part of the steam turbine, which superheater surfaces are connected on the outlet side to the medium-pressure part of the steam turbine.

As European Patent Application 0 129 167 shows, such processes for waste heat steam generation are used primarily downstream of gas turbines, in order to usefully exploit the considerable quantities of heat contained in the gas turbine exhaust gases in order to generate steam. In combined gas and steam turbine power plants, also known as combined cycle power plants, steam turbines are driven with the thus-produced steam to additionally generate electrical energy. Waste heat steam generators are also used downstream of coal gasification systems, however, to cool the crude gas produced in them. The steam generated in the waste heat steam generator is also sometimes used as process steam or simply as heating steam. In all these fields of application, but in particular in combined gas and steam turbine power plants, care is taken to make the individual and total efficiency as high as possible, because of the large amounts of energy to be converted.

The object of the invention is to improve the efficiency in waste heat steam generation. Particularly in combined gas and steam turbine power plants, the object is to maximize the total efficiency.

This object is attained in accordance with the invention, in a process for operating a steam turbine that has at least one medium-pressure part and one high-pressure part, with the aid of a waste heat steam generator through which hot gas flows, in that superheated steam generated in a high-pressure heating surface system is supplied to the high-pressure part of the steam turbine; a smaller quantity of steam is admixed with the exhaust steam of the high-pressure part of the steam turbine, this smaller quantity of steam being produced in intermediate superheater evaporator heating surfaces in the waste heat steam generator from preheated feedwater supplied to it; the mixture of the smaller quantity of steam and the exhaust steam is superheated in intermediate superheater heating surfaces of the waste heat steam generator; and the thus-superheated steam mixture is delivered to the medium-pressure part of the steam turbine. As a result, particularly good adaptation of the feedwater temperature or steam temperature to the flue gas temperature in the waste heat steam generator, and thus the highest possible efficiency in steam production, are attained.

In a system for performing the process of claim 1, having a steam turbine having at least one medium-pressure part and one high-pressure part, having a waste heat steam generator through which hot gas flows, having a high-pressure heating surface system connected to the high-pressure part of the steam turbine, and having intermediate superheater heating surfaces connected to the exhaust steam line of the high-pressure part of the steam turbine, the intermediate superheater heating surfaces being connected on the outlet side to the medium-pressure part of the steam turbine, it is provided in accordance with the invention that the feedwater line of the waste heat steam generator leads to a branching point, from which a first segment leads into the high-pressure heating surface system and a second segment leads into intermediate superheater evaporator heating surfaces, and means for varying the distribution ratio are associated with at least one of the two segments. By means of these provisions, the greatest possible flexibility in performing the process and adaptability to the profile of the flue gas temperature in the waste heat steam generator are attained.

Further advantageous embodiments are disclosed in claims 2-5 and 7 through 16, respectively.

In a particularly advantageous feature of the invention, the temperature of the steam at the outlet of the intermediate superheater heating surfaces can be made to approximate the temperature of the steam at the outlet of the high-pressure superheater heating surfaces. This provision improves the thermodynamic efficiency in the utilization of the steam in the medium-pressure part of the steam turbine.

In a suitable further feature of the invention, the preheated feedwater delivered to the intermediate superheater evaporator heating surfaces can be diverted from the preheated feedwater flowing into the high-pressure heating surface system. As a result, by increased diversion of preheated feedwater from the first segment, associated with the high-pressure heating surface system, of the feedwater line, an increased amount of medium-pressure steam is generated in the second segment of the feedwater line, associated with the intermediate superheater evaporator heating surfaces; thus the volume of steam flowing to the medium-pressure part of the steam turbine is increased while simultaneously decreasing its temperature, and vice versa. This provision permits very effective regulation of the steam inlet temperature at the medium-pressure part of the steam turbine, and at the same time enables better adaptation of the temperature in the heating surfaces of the waste heat steam generator to the flue gas profile.

In a particularly advantageous feature of the invention, this kind of operation can be attained with a waste heat steam generator that has a high-pressure heating surface system for generating a superheated steam, which can be supplied to the high-pressure part of a steam turbine; intermediate superheater evaporator heating surfaces to which preheated feedwater can be supplied for evaporation and optional superheating and which are connectable by their outlet to their exhaust steam line of the high-pressure part of the steam turbine; and intermediate superheater heating surfaces which are connectable by their inlet to the outlet of the intermediate superheater evaporator heating surfaces and are connectable to the exhaust steam line of the high-pressure part of the steam turbine, and which are provided for superheating the mixture of the exhaust steam of the high-pressure part of the steam turbine and the steam from the intermediate superheater evaporator heating surfaces, and the outlet of which is connectable via a line to the medium-pressure part of the steam turbine.

It has proved to be particularly advantageous to dispose both the high-pressure superheater heating surfaces and the intermediate superheater heating surfaces in the waste heat steam generator in the region of the same, greatest gas temperature. This provision makes it especially easy to heat both the intermediate superheater steam and the high-pressure steam to the same temperature.

The pressure difference between the high-pressure heating surface system on the one hand and the intermediate superheater evaporator heating surfaces on the other can be attained in a simple manner, in a feature of the invention, by means of a throttle valve installed in the second segment leading to the medium-pressure evaporator heating surfaces.

The pressure difference between the high-pressure heating surface system on the one hand and the intermediate superheater evaporator heating surfaces on the other can also be attained in a simple manner, in a feature of the invention, by means of a further rpm-controlled feed pump installed in the first segment. By means of this provision, the feedwater pump at the inlet to the preheater heating surfaces need merely produce the pressure of the intermediate superheater evaporator heating surfaces, while the pressure difference between the intermediate superheater evaporator heating surfaces on the one hand and the high-pressure heating surface system on the other is equalized by means of the further rpm-controlled feed pump.

In an advantageous feature of the invention, a regulating valve can be installed in the second segment, for variable distribution of the feedwater to the two feedwater segments. This makes it possible, via temperature measuring probes installed at the outlet of the intermediate and the high-pressure superheater heating surfaces, to regulate the distribution of the feed water such that the steam temperatures at the output of both these superheater heating surfaces approximate one another.

Figure 2:
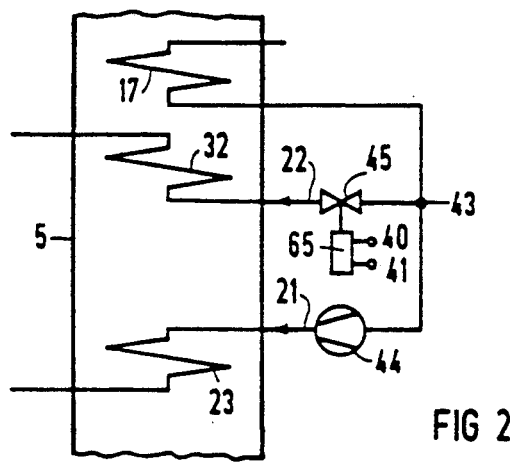
Figure 3:
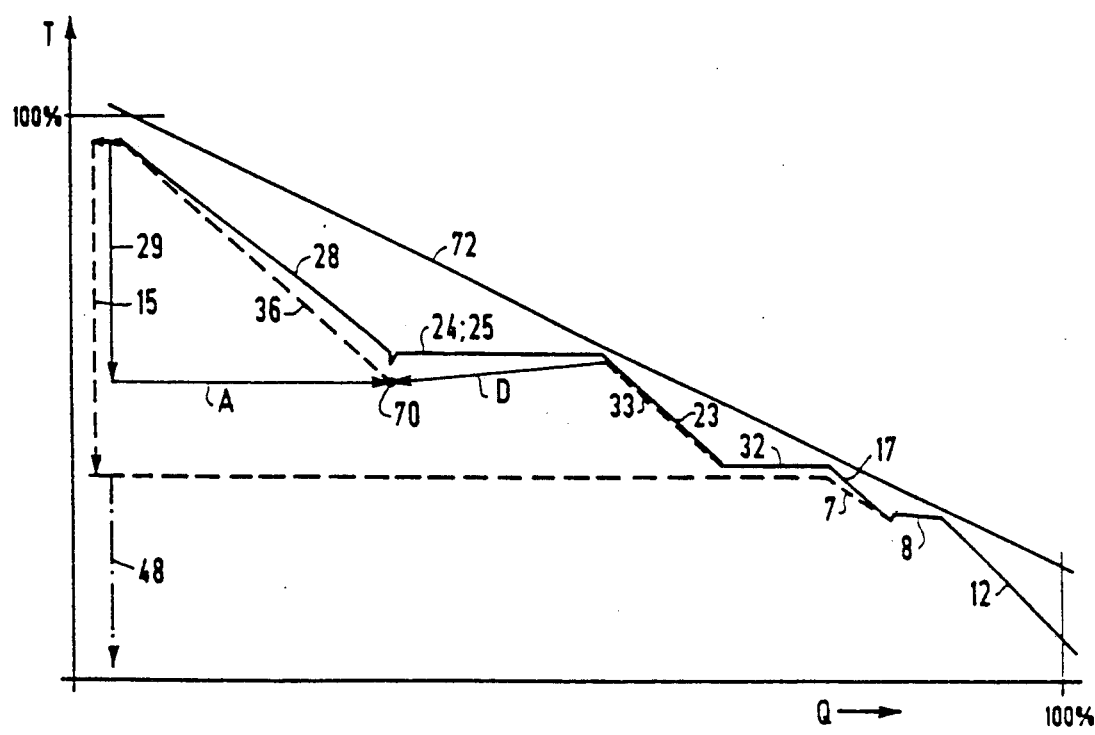

Further details of the invention will now be explained in conjunction with two exemplary embodiments shown in the drawings. Shown are:

FIG. 1, a schematic illustration of a system according to the invention for waste heat steam generation;

FIG. 2, an embodiment, differing from the exemplary embodiment of FIG. 1, of a branching point in the feedwater segment; and FIG. 3, the disposition of the various heating surfaces of the waste heat steam generator in a Q/T diagram.

FIG. 1 is a schematic illustration of a gas and steam turbine power plant 2 having a gas turbine power plant part 1 and a steam power plant part 6. Connected to the exhaust gas line 3 of the gas turbine 4 is a waste heat steam generator 5. The steam turbine 47 of the steam power plant 6 is connected in turn to the heating surfaces of the waste heat steam generator 5, as will be explained hereinafter. In this exemplary embodiment, this steam turbine includes a high-pressure part 29, a medium-pressure part 15 and a low-pressure part 48 and drives a generator 49.

An air compressor 7 and a generator 8 are coupled to the gas turbine 4. A combustion chamber 10, which is operated with fuel such as natural gas or petroleum, is provided at the fresh-air line 9 between the air compressor 7 and the gas turbine 4.

The exhaust gas line 3 of the gas turbine leads via the waste heat steam generator 5 to a chimney 11. On the gas outlet side, that is, on the cold side of the waste heat steam generator 5, condensate preheating heating surfaces 12 can be seen. On the inlet side they are connected via a condensate pump 13 to a condenser 14. On the outlet side they lead into a feedwater tank 16. Connected to this feedwater tank 16 is a feedwater circulation pump 50, which in turn is connected to the inlet of the condensate preheater heating surfaces 12. Also connected to the feedwater tank 16 is a low-pressure feedwater pump 51, which is connected on the outlet side to a low-pressure water/steam separation vessel 53. Located in the vicinity of the condensate preheater heating surfaces 12, are the low-pressure evaporator heater surfaces 54 that are connected on the inlet and outlet side, via a circulating pump 55, to the low-pressure water-steam separation vessel 53. On the steam side, the low-pressure water/steam separation vessel 53 is connected via low-pressure superheating heating surfaces 56 to the low-pressure part 48 of the steam turbine 4. Toward the warmer side of the waste heat steam generator 5, first high-pressure economizer heating surfaces 7 are installed in the waste heat steam generator, next to the low-pressure superheater heating surfaces 56. The heating surfaces 17 are connected on the inlet side to the feedwater line 18, via a feedwater pump 19. On the outlet side, these first high-pressure economizer heating surfaces 17 are connected to a branching point 20, from which a first and a second segment 21 and 22 diverge.

In the exemplary embodiment of FIG. 1, the first segment 21, also called the high-pressure segment, leads directly into second high-pressure economizer heating surfaces 23 and into a high-pressure water/steam separation vessel 26 connected to them. Connected to this high-pressure water/steam separation vessel 26, via a circulating pump, are two series-connected high-pressure evaporator heating surfaces 24, 25. Connected to the high-pressure water/steam separation vessel 26 on the steam side is a high-pressure steam line 27, which via high-pressure superheater heating surfaces 28 leads to the steam line 47 that leads to the high-pressure part 29 of the steam turbine 47.

The second segment 22 branching off from the branching point 20, also called the medium-pressure segment, leads via a regulating valve 30 and a throttle restriction 31 to two series-connected medium-pressure evaporator heating surfaces 32, 33 located in the waste heat steam generator 5 between the first high-pressure economizer heating surfaces 17 and the second high-pressure economizer heating surfaces 23. These medium-pressure heating surfaces are connected on the outlet side via a steam line 58 to intermediate superheater heating surfaces 36, which together with the high-pressure superheater heating surfaces 28 are installed on the hot end, that is, the side of the waste heat steam generator 5 at which the hot exhaust gases of the gas turbine 4 flow in. The intermediate superheater heating surfaces 36 are connected on the outlet side to the medium-pressure part 15 of the steam turbine 47. The steam line 58 discharges, still upstream of the intermediate superheater heating surfaces, at a connecting point 70 into the exhaust steam line 35 leading from the high-pressure part 29 of the steam turbine 47 to the intermediate superheater heating surfaces 36.

Both the high-pressure superheater heating surfaces 28 and the intermediate superheater heating surfaces 36 are installed on the exhaust gas inlet side of the waste heat steam generator 5, specifically in the same temperature region of it. This is indicated by the drawing of the symbols for the heating surfaces. As indicated by dashed lines, a medium-pressure water/steam separation vessel 34 with a circulating pump 39 can also be installed in the steam line 58 leading from the intermediate superheater evaporator heating surfaces 32, 33 to the intermediate superheater heating surfaces, in order to recirculate as-yet unevaporated feedwater into the evaporator superheater heating surfaces.

Located at the steam outlet from the two superheater heating surfaces 28 and 36 are respective measuring probes 40 and 41, for measuring the steam temperature. These measuring probes 40, 41 are connected to the regulating valve 30 in the second segment 32 via a signal processing and regulating stage 64.

During operation, the gas turbine 4 drives the generator and the generator 8 and the air compressor 7 that is mounted on the same shaft; this compressor supplies the combustion chamber 10 of the gas turbine 4 with fresh air. In the exemplary embodiment, the hot exhaust gases of the gas turbine 4 flow through the waste heat steam generator 5 from bottom to top, giving up their heat successively to the various heating surfaces 28 and 36, as well as 25, 24, 23, 33, 32, 17, 56, 54 and 12, in this order, that are installed in the waste heat steam generator 5. After that, these gases are vented, cooled, into the chimney 11 that in this exemplary embodiment is at the upper end of the waste heat steam generator 5. Heat at various temperature levels is available in the waste heat steam generator. At the cool lower end, the heat is used in order to warm up the condensate, pumped via the condensate pump 13, prior to introducing it into the feedwater tank 16, or to further warm up the contents of the feedwater tank 16 by means of the feedwater recirculating pump 50. For furnishing the low-pressure steam required for operating the low-pressure steam turbine 48, the feedwater is pumped by the low-pressure feedwater pump 52 into the low-pressure water/steam separation vessel 53, and from there is pumped via the recirculating pump 55 into the low-pressure evaporator heating surfaces 54. Via the low-pressure superheater heating surfaces 56 and the low-pressure steam line 57, the steam forming in the low-pressure water/steam separation vessel 53 reaches the low-pressure part 48 of the steam turbine 47 and from there again reaches the condensor 14.

For furnishing the steam required for operating the medium-pressure part 15 and high-pressure part 29 of the steam turbine 47, the feedwater is pumped by the feedwater pump 19 out of the feedwater tank 16 into first high-pressure economizer heating surfaces 17, is heated further there, and via the branching point 20 is pumped into both the first so-called high-pressure segment 21 and the second so-called medium-pressure segment 22.

The feedwater pumped through the high-pressure segment 21 is first heated in the high-pressure economizer 23 and evaporated in the two series-connected high-pressure evaporator heating surfaces 24, 25; feedwater that has not yet evaporated is pumped back into the high-pressure evaporator heating surfaces 24, 25 via the high-pressure water/steam separation vessel 26 and the recirculating pump 38. Via the high-pressure steam line 27, the steam withdrawn at the upper end of the water/steam separation vessel 26 reaches the high-pressure superheater heating surfaces 28 of the waste heat steam generator 5. There, it is superheated to the temperature provided for the high-pressure part 29 of the steam turbine 47. The superheated high-pressure steam H, the temperature of which is measured by the sensor 40, flows via the line 47 into the high-pressure part 29 of the steam turbine 47. The partially expanded so-called exhaust steam A emerging from the outlet from the high-pressure part 29 of the steam turbine is carried, along with the steam D that has been produced in the medium-pressure evaporator heating surfaces 32, 33, into the intermediate superheater heating surfaces 36 via the exhaust steam line 35. In these heating surfaces, this steam is heated to virtually the same high-temperature high-pressure steam H, and is delivered as medium-pressure steam or intermediately superheated steam ZÜD to the medium-pressure part 15 of the steam turbine 47, via the steam supply line 37. The temperature of the medium-pressure steam is measured with the sensor 41. The exhaust steam of the medium-pressure part 15 of the steam turbine 47 is fed into the low-pressure steam line 57 coming from the low-pressure superheater heating surfaces and leading to the low-pressure part 48 of the steam turbine. This exhaust steam can be utilized still further in the low-pressure part 48 of the steam turbine.

The second segment 22 leading away from the branching point 20 carried heated feedwater via the regulating valve 30 and the throttle restriction 31—in which the pressure is decreased to the inlet pressure of the medium-pressure part 15 of the steam turbine—into the second medium-pressure evaporator heating surfaces 32, 33. The medium-pressure steam produced there is fed into the exhaust steam line 35 at the connecting point 70. It thus increases the quantity of steam to be heated in the intermediate superheater heating surfaces 36. The result of this is that via the measuring probes 40, 41 that are disposed at the outlet of the high-pressure superheater heating surfaces 28 and intermediate superheater heating surfaces 36 and that measure the steam states in the two steam supply lines 47 and 37, the regulating valve 30 can be controlled in such a way that the steam temperatures at the outlet of the two superheater heating surfaces 28, 36 approximate one another. This is because upon further opening of the regulating valves 30, somewhat less feedwater flows into the high-pressure heating surface system 23, 24, 25, 28. In other words, somewhat less high-pressure steam H is produced, but in return this steam is heated to a greater extent in the high-pressure superheater heating surfaces, and at the same time more medium-pressure steam is generated. This latter factor leads to a lowering of the temperature at the outlet of the superheater evaporator heating surfaces 32, 33 and to a cooler steam D in the steam line 58. As a result, the temperature of the Z]D steam downstream of the intermediate superheater heating surfaces 36 also drops, and vice versa. This all takes place without the use of injection coolers, which are unnecessary here and would only lower the total efficiency.

The overall result is that the waste heat steam generator 5 can be regulated such that the temperatures of both the high-pressure steam H and the intermediate superheater steam Z]D in the steam lines 47 and 37 can be raised to approximately the same temperature level that is still tolerated by the steam turbine. The thermodynamic efficiency rises, particularly in the medium-pressure part 15 of the steam turbine, even though somewhat less steam overall is generated. Moreover, the further advantage is attained that by merely varying the feedwater quantities that are fed into the two segments 21, 22, fluctuations in heating output caused for instance by changes in the fuel in the combustion chamber 10 can be compensated for to optimize the total efficiency, without using injection coolers. If the medium-pressure water/steam separation vessel 34, merely suggested by dashed lines in FIG. 1, is installed next to the recirculating pump 39, then wet steam is reliably prevented from being able to enter the steam line 58, but on the other hand the controllability of the complete system is restricted as a result.

FIG. 2 shows a various of the exemplary embodiment of FIG. 1. Here the branching point provided with reference numeral 20 in FIG. 1 for the two segments 21, 22 is identified by reference numeral 43. A pressure elevating pump 44 is located in the first segment 21, and a controllable regulating valve 45, which is controlled by a regulating stage 65 as a function of the temperature measured at the measuring probes 40, 41, is located in the second segment 22. With an otherwise identical structure of the gas and steam turbine power plant 2 including the waste heat steam generator 5, the feedwater pump 19 needs to build up only the pressure that is equivalent to the steam pressure at the inlet to the medium-pressure part 15 of the steam turbine 47. Since this pressure is available at the branching point 43, an additional pressure elevating pump 44 must be used in the first segment 21 of the feedwater line leading to the high-pressure evaporator heating surfaces 24 and 25. In return, the throttle restriction 31 at the second segment 22 leading to the intermediate superheater evaporator heating surfaces 32, 33 can be dispensed with, so that only the regulating valve 45 is now needed in this second segment 22. If the rpm of the pressure elevating pump 44 is regulated, then even the regulating valve 45 can be dispensed with. Otherwise, the advantages of the regulation and of the higher efficiency are the same as in the exemplary embodiment of FIG. 1.

FIG. 3, in a Q/T diagram, shows the transmission of the heat output of the flue gas to the feedwater flowing into the various heating surfaces of the waste heat steam generator 5, or on the steam produced from it as a function of the temperature. Located in the left portion of the diagram, in the region 72 of high flue gas temperatures, is the high-pressure system, in which high-pressure steam of from 110 to 150 bar is produced in the high-pressure evaporator heating surfaces 24, 25 and superheated in the high-pressure superheater heating surfaces 28. Also located in the left portion of the diagram are the intermediate superheater heating surfaces 36, in which the exhaust steam A, which has emerged from the high-pressure part 29 of the steam turbine 47 at approximately 20 to 40 bar, along with further medium-pressure steam D in the connection point 70, is superheated to relatively high temperatures.

Shown in the middle portion of the diagram in FIG. 3, at already lower flue gas temperatures, is the situation of the high-pressure economizer heating surfaces 17 and 23, in which the feedwater is preheated, and of the intermediate superheater evaporator heating surfaces 32, 33. The somewhat superheated steam obtained in the intermediate superheater evaporator heating surfaces is admixed with the exhaust steam A of the high-pressure part of the steam turbine at 70 and is further superheated along with it in the intermediate superheater heating surfaces 36, after which it is then fed into the medium-pressure part 15 of the steam turbine 47.

In the last portion of the diagram of FIG. 3, on the right, at already markedly cooled-down flue gas temperatures, low-pressure steam of approximately 3 to 7 bar is produced in the low-pressure evaporator heating surfaces 54 from the preheated feedwater and superheated in the low-pressure superheater heating surfaces 56. The feedwater and condensate are again preheated in condensate preheating heating surfaces 12. The low-pressure steam N superheated in the low-pressure superheater heating surfaces 56 flows along with the exhaust steam from the medium-pressure part 15 of the steam turbine 47 into the low-pressure part 48 of the steam turbine and there expands up to the pressure prevailing in the condenser. It can be seen in the diagram that the medium temperature of heat transmission to the feedwater or steam is approximated very closely to the prevailing flue gas temperature over the entire course of the flue gas temperature in the waste heat steam generator 5, which leads to optimal heat transfer efficiency and hence optimal waste heat utilization.

What is claimed:

1. A process for operating a steam turbine that has at least one medium-pressure part and one high-pressure part, with the aid of a waste heat steam generator through which hot gas flows, which comprises:
   a) supplying superheated steam generated in a high-pressure heating surface system to the high-pressure part of the steam turbine;
   b) admixing a smaller, adjustable quantity of steam with the exhaust steam of the high-pressure part of the steam turbine, which smaller quantity of steam is produced in medium-pressure evaporator heating surfaces in the waste heat steam generator from preheated feedwater supplied to it;
   c) superheating the mixture of the smaller quantity of steam and the exhaust steam in intermediate superheater heating surfaces of the waste heat steam generator;
   d) delivering the thus-superheated steam mixture to the medium-pressure part of the steam turbine; and
   e) approximating the temperature of the steam at the outlet of the intermediate superheater heating surfaces to the temperature of the steam at the outlet of the high-pressure superheater heating surfaces.

2. The process according to claim 1, which further comprises:
   diverting the preheated feedwater delivered to the medium-pressure evaporator heating surfaces from the preheated feedwater flowing into the high-pressure heating surface system.

3. The process according to claim 1 which further comprises:
   distributing the feedwater between the high-pressure heating surface system and the medium-pressure evaporator heating surfaces as a function of the temperature of the steam at the outlet of the intermediate superheater heating surfaces.

4. The process according to claim 1, which further comprises:
   distributing the feedwater between the high-pressure heating surface systems and the medium-pressure evaporator heating surfaces as a function of the difference in temperatures of the steam at the outlet of the high-pressure superheater heating surfaces and at the outlet of the intermediate superheater heating surfaces.

5. A system for operating a gas and steam turbine power plant, comprising:
   a steam turbine having at least one medium-pressure part and one high-pressure part with an exhaust steam line,
   a waste heat steam generator through which hot gas flows, having a high-pressure heating surface system connected to said high-pressure part of said steam turbine, and having intermediate superheater heating surfaces connected to said exhaust steam line of said high-pressure part of said steam turbine, said intermediate superheater heating surfaces being connected on the outlet side to said medium-pressure part of said steam turbine, medium-pressure evaporator heating surfaces having an outlet, and said intermediate superheater heating surfaces having an inlet and an outlet, said outlet of said medium-pressure evaporator heating surfaces leading into said inlet of said intermediate superheater heating surfaces, a branching point having a first segment leading into said high-pressure heating surface system and a second segment leading to said medium-pressure evaporator heating surfaces, said waste heat steam generator including a feedwater line leading to said branching point, and means associated with at least one of said first and second segments for varying the distribution ratio therebetween for approximating the temperature of the steam at said outlet of said intermediate superheater heating surfaces to the temperature of the steam at the outlet of said high-pressure superheater heating surfaces.

6. The system according to claim 5, wherein said high-pressure heating surface system is provided for generating a superheated steam to be supplied to said high-pressure part of said steam turbine, wherein said medium-pressure evaporator heating surfaces are provided to be supplied with preheated feedwater for evaporation and optional superheating; and said medium-pressure evaporator surfaces being connectable by said outlet to said exhaust steam line of said high-pressure part of said steam turbine, said inlet of said intermediate superheater heating surfaces being connectable to said outlet of said intermediate superheater evaporator heating surfaces and being connectable to said exhaust steam line of said high-pressure part of said steam turbine, and being provided for superheating the mixture of the exhaust steam of said high-pressure part of said steam turbine and the steam from said medium-pressure evaporator heating surfaces, and including a line for connecting said outlet of said intermediate superheater heating surfaces to said medium-pressure part of said steam turbine.

7. The system according to claim 5, including a throttle valve installed in said second segment leading to said medium-pressure evaporator heating surfaces.

8. The system according to claim 5, wherein said means for variable distribution of the feedwater to said two feedwater segments, are in the form of an rpm-controlled pressure elevating pump provided in said first segment.

9. The system according to claim 5, wherein said means for variable distribution of the feedwater to said two feedwater segments, are in the form of a regulating valve installed in said second segment.

10. The system according to claim 5, wherein a region of greatest gas temperature is defined in said waste heat steam generator and wherein said high-pressure superheater heating surfaces (28) and said intermediate superheater heating surfaces (36) are disposed within said region.

11. The system according to claim 5, including temperature measuring probes provided at said outlet of said superheater heating surfaces for controlling said means for varying the distribution ratio of the feedwater to said two segments.

12. The system according to claim 5, including high-pressure economizer heating surfaces installed in said first segment leading to said high-pressure evaporator heating surfaces.

13. The system according to claim 12, wherein said high-pressure economizer heating surfaces are second economizer heating surfaces, and said branching point is installed upstream, in the flow direction of the feedwater, of said second economizer heating surfaces (23).

14. The system according to claim 5, wherein said outlet of said medium-pressure evaporator heating surfaces is connected to said exhaust steam line of said high-pressure part leading to said intermediate superheater heating surfaces.

15. The system according to claim 5, including first high-pressure economizer heating surfaces, wherein said branching point is installed downstream, in the flow direction of the feedwater, of said first high-pressure economizer heating surfaces.

16. The system according to claim 5, wherein a gas turbine power plant with an exhaust gas line is associated with said steam power plant part, the exhaust gas line being connected to said waste heat steam generator.

* * * * *